United States Patent [19]
Caldwell

[11] 3,924,080
[45] Dec. 2, 1975

[54] ZERO SUPPRESSION IN PULSE TRANSMISSION SYSTEMS

[75] Inventor: James Lewis Caldwell, Parsippany, N.J.

[73] Assignee: Bell Telephone Laboratories, Incorporated, Murray Hill, N.J.

[22] Filed: Dec. 2, 1974

[21] Appl. No.: 528,728

[52] U.S. Cl. 179/15 BS; 179/15 AD
[51] Int. Cl.[2] H04J 3/06
[58] Field of Search 179/15 BS, 15 AD; 178/53, 178/71 B, 71 L, 82 R

[56] References Cited
UNITED STATES PATENTS

| | | | |
|---|---|---|---|
| 3,302,193 | 1/1967 | Sipress | 340/347 |
| 3,590,380 | 6/1971 | Zegers et al. | 179/15 AD |
| 3,597,549 | 8/1971 | Farmer | 179/15 AL |

OTHER PUBLICATIONS

"An Experimental P.C.M..." by C. G. Davis, *The Bell System Technical Journal*, Vol. 41, No. 1, pp. 1-24.
"DZ Channel Bank...", by Dammann et al., *The Bell System Technical Journal*, Vol. 51, No. 8, pp. 1675-1699.

*Primary Examiner*—Douglas W. Olms
*Attorney, Agent, or Firm*—R. O. Nimtz

[57] ABSTRACT

An algorithm and circuit arrangement is shown for suppressing unduly long successions of ZEROs in a pulse transmission system by recording the occurrence of most recently occurring ONEs, using a state encoding mechanism such as a counter. If a sequence of ZEROs occurs which would extend the ZEROs to the group succeeding the group initiated by the most recently occurring ONE, a ONE is forced in the last position of the succeeding group. Thereafter, a ONE must be forced at the end of each succeeding group in which a ONE does not naturally occur. If two ONEs occur naturally in any such succeeding group, the second ONE restarts the entire process as described above. The size of the group is chosen to meet minimum pulse density requirements of the connected pulse transmission system.

9 Claims, 4 Drawing Figures

GENERAL STATE DIAGRAM

ZERO SUPPRESSION IN PULSE TRANSMISSION SYSTEMS

FIELD OF THE INVENTION

This invention relates to pulse transmission systems and, more particularly, to the maintenance of timing recovery in such systems.

BACKGROUND OF THE INVENTION

Regenerative repeaters for digital transmission lines typically require some minimum pulse density over the short term as well as over the long term, in order to preserve sufficient timing information to regenerate pulses at an acceptable error rate. It is typical in such systems to define the required pulse density as the number of ONEs in the group of N pulse positions. One particularly salutary example of such a system is the T1 Transmission System, described in "An Experimental Pulse Code Modulation System for Short Haul Trunks," by Mr. C. G. Davis, appearing in the Bell System Technical Journal, Vol. 41, No. 1, pp. 1–24, January 1962. Using such a system for the transmission of pulse code modulated (PCM) signals provides a natural grouping of eight bits for each PCM word. The minimum required pulse density for this system is one ONE in each group of eight bits. An obvious solution is to disallow the all ZEROs code and to force a ONE in the lowest order bit position where its impact on signal-to-noise ratio is minimal. This technique is disclosed in "D2 Channel Bank: Multiplexing and Coding," by C. L. Damman et al, *Bell System Technical Journal*, Vol. 51, No. 8, pp. 1675–1699, October 1972.

Many signal formats, however, are not so easily accommodated to forced ONEs. An example is a multiplexed bit stream of delta modulation channels. In such a channel, each data bit typically has (a priori) the same "weight" as the others. If a T1-type zero suppression method were applied, using artifically defined n-digit blocks, the average rate of errors generated by forcing ONEs to suppress all blocks would typically cause unacceptable signal degradation. The rate of forced ONEs must be reduced.

Prior art solutions to this problem have included ternary block substitution codes which generate violations of line coding rules to signal a forced ONE. A system using this technique for supervisory signalling is disclosed in W. D. Farmer et al., U.S. Pat. No. 3,597,549, granted Aug. 3, 1971. Using this technique has the advantage of detecting the forced ONE at the remote terminal where it can be deleted. In addition to requiring additional complex circuitry, this approach destroys the integrity of the line coding rules which, for example, complicates the monitoring of line errors in test operations, and may degrade line performance.

A need therefore exists for a reasonably simple technique for satisfying the ONEs density requirements without line code violations and, at the same time, a technique in which the probability of forcing a ONE is considerably lower than any of the prior art schemes described above.

SUMMARY OF THE INVENTION

The present invention comprises a method and apparatus which utilizes the principle of artificial data block definition, guaranteeing each block contains a ONE, but adjusts the length of the blocks according to data received, such as to avoid forcing ONEs unnecessary to achieving required pulse density. This is accomplished by selecting block boundaries such that the maximum allowable number of ZEROs is allowed to occur before a ONE is forced. Since the probability of a sequence of ZEROs typically decreases with sequence length, this results in a minimum probability of forced ONEs, while assuring that for a selectable integer N, the processed bit stream may be divided into a sequence of adjacent blocks of N or fewer digits, each containing at least one ONE.

Specifically, following any received sequence of N or fewer successive digits of which at least two digits are ONEs, the last received ONE begins a "block," and serves as the one ONE required for that block. If N-1 or more ZEROs follow the ONE, then the said block is terminated after the (N-1)th ZERO, and a second block begins. This block is not necessarily begun by a ONE, and its end boundary is determined by different rules. If exactly one ONE occurs within the N digits following the first block, then the second block terminates after the Nth digit, and the third block follows the rules of the second. If no ONEs are received for N digits, a ONE is forced in the Nth digit position, and the block terminates after the ONE: again, the third block follows the rules of the second. If two or more ONEs occur within the N digits following the first block, then the second block ends with the digit preceding the second ONE (and is thus less than N digits long), while the third block begins with the second one and follows the rules of the first block.

DETAILED DESCRIPTION OF THE DRAWING

Figure 1:
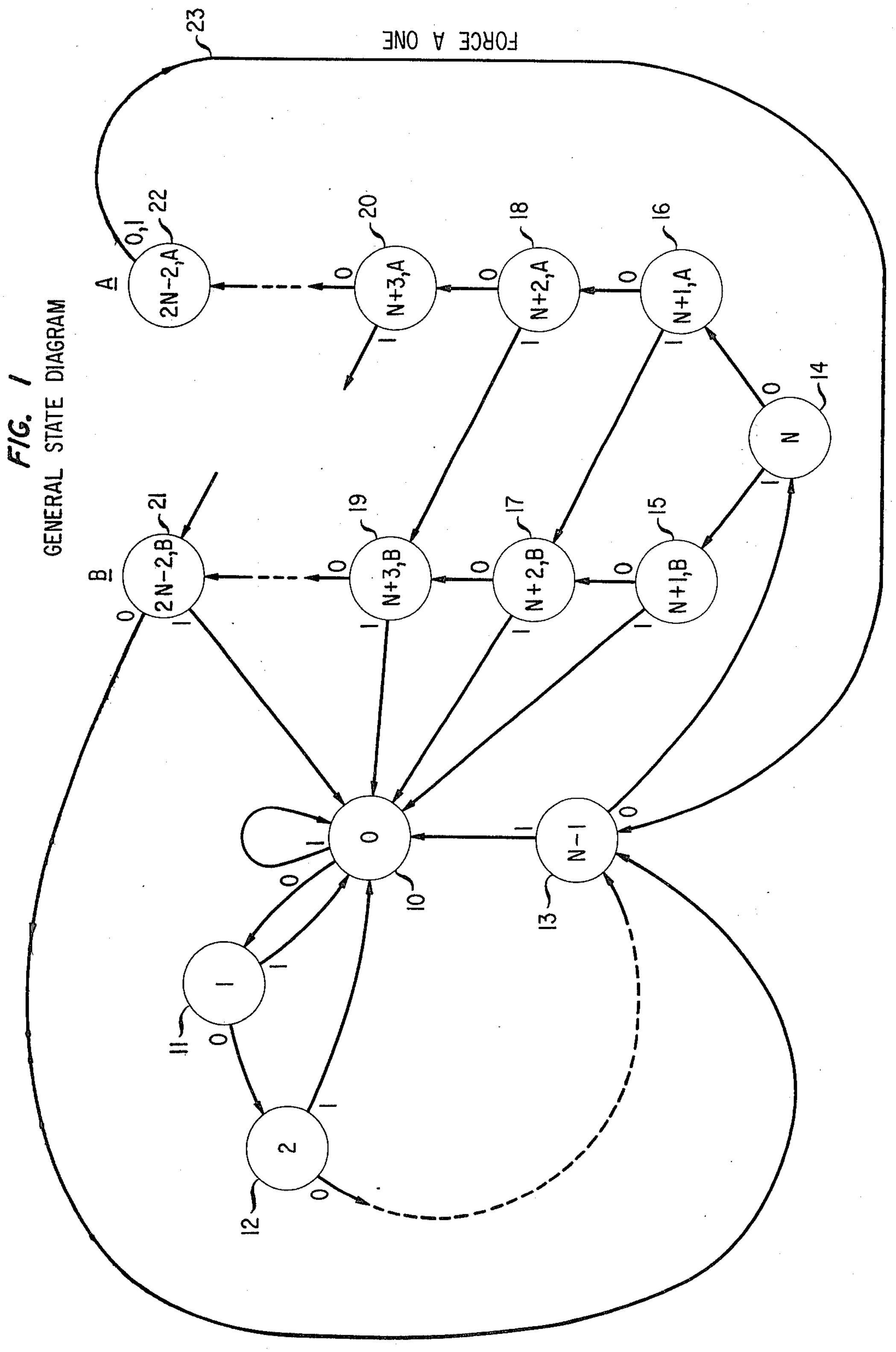
FIG. 1 is a state transition diagram of the zero suppression algorithm of the present invention for the general case of a group length of N.

Referring more particularly to FIG. 1, there is shown a state diagram of the algorithm of the present invention. Each of the circles in FIG. 1 represents one state of the zero suppression system of the present invention. Each arrow between the circles represents a transition from the state at the tail of the arrow to the state at the head of the arrow. In the context of the present invention, the various states represent the number (e.g., 1, 2, . . . N) of successive pulse positions appearing in an input data pulse stream. The transitions between states are determined by the occurrences of ONEs of ZEROs in the pulse stream. Transitions to lower-numbered states correspond to termination of data blocks, as do transitions from state 13 to state 14.

Assuming no prior history, the system is assumed to begin in state 10 and proceeds to state 11 with the appearance of the first ZERO. A second ZERO forces a transition to state 12 and succeeding ZEROs force transitions to succeeding states up to state 13 following (N-1) successive ZEROs. N in this case is the maximum length of a group of pulse positions in which at least one ONE must occur in order to permit proper timing recovery in the pulse transmission system.

The occurrence of a ONE at any time prior to the first N ZEROs will cause a transition back to state 10 from which the process starts all over again. The occurrence of the Nth ZERO, however, causes a transition to state 14 from which a transition is possible to state 15 or 16. A ZERO causes the transition to state 16 while a ONE causes a transition to state 15. Similarly, a ZERO causes a transition from state 15 to state 17 and a ZERO causes a transition from state 16 to state 18. A ZERO likewise causes a transition from state 17 to state 19, while a ZERO causes a transition from state 18 to state 20.

It can be seen that ZEROs cause transitions up column A of states 16, 18, 20 . . . while similarly ZEROs cause transitions up column B of states 15, 17, 19 . . . Thus, at the top of column B is state 21 entered from the bottom by a ZERO transition from a preceding B state. Similarly, at the top of column A is state 22 entered from the bottom by a ZERO from the immediately preceding A state. ONEs occurring during any one of the A states cause transitions to the next higher B states. Thus, a ONE causes a transition from state 16 to state 17 and a ONE causes a transition from state 18 to state 19. A succeeding ONE causes a transition from any of the states of columns B back to the initial state 10. A ZERO, while in state 21, causes a transition from state 21 back to state 13. Finally, either a ZERO or a ONE, while in state 22, causes a transition from state 22 back to state 13 and, at the same time, forces a ONE output into the data pulse stream. The operation of the algorithm illustrated by the state diagram of FIG. 1 can be better understood by considering the pulse timing diagram of FIG. 4.

Figure 4:
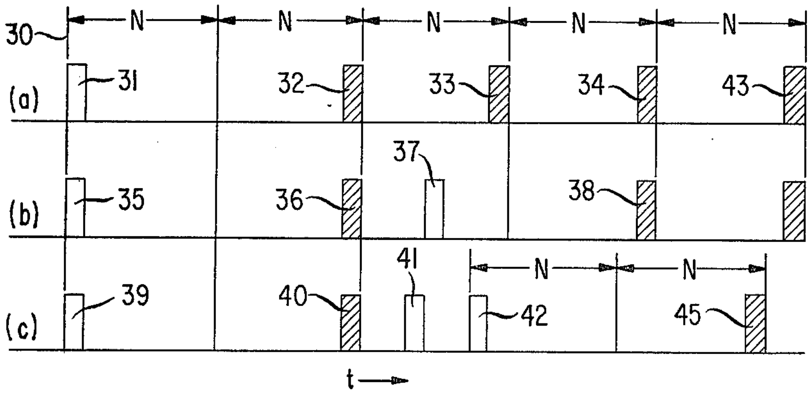
FIG. 4 is a pulse timing diagram useful in explaining the operation of the other figures.

Referring then to FIG. 4, there is shown a timing diagram in which time is the horizontal axis and pulse amplitude is the vertical axis. Starting at a time 30 at which time a pulse occurs in the input pulse stream, if prior history can be ignored it is possible, as shown in pulse waveform (a), to delay forcing a ONE for almost two full periods of length N. This, if pulse 31 begins a group of N pulse positions, then the forced pulse 32 (indicated by a darkened pulse) need not be forced until the end of the next succeeding group of N pulse positions. Thereafter, however, a pulse must be forced at the end of each group of N pulse positions as shown by forced pulses 33, 34, and 43. It is necessary to force ONEs in each group in order to conform to the overall requirement of having at least one ONE in each such group. It is no longer possible, as it was in the first two groups of N positions, to ignore prior history in meeting this objective.

The pattern shown in waveform (a) will continue until a ONE occurs in the input pulse stream. This condition is illustrated in waveform (b). As before, it is assumed that at time 30 an input pulse 35 is detected. Assuming this pulse is followed by a succession of ZEROs, it is again not necessary to force a ONE until the end of the second group of N positions at which time pulse 36 is formed. Thereafter, whenever a single pulse occurs at any time during succeeding groups of N pulse positions, such as pulse 37, it is not necessary to force a ONE at the end of that group (corresponding to forced pulse 33). Groups of N pulse positions in which an input pulse does not occur, however, will still require a forced ONE, such as forced pulses 38 and 44. This condition, as illustrated as waveform (b), will persist as long as no more than one pulse occurs naturally in each group of N positions.

In waveform (c) an input pulse 39 initiates the first group of N pulse positions after which a forced pulse 40 does not occur until the end of the next succeeding group of N pulse positions, all as before. If two input pulses are detected in any succeeding group of N pulses, the second ONE pulse inaugurates a new grouping of pulse positions such that the next ONE to be forced (forced ONE pulse 45) need not be forced until the end of the next succeeding group of N pulse positions. Thereafter, operation continues as described above, using the new position groupings.

The operation described in connection with FIG. 4 is implemented by the state diagram of FIG. 1 by assuming that state 10 correspond to the detection of an input pulse such as pulses 31, 35, or 39. The following succession of ZEROs causes transitions successively to states 11, 12, and so on, to state 13, and thereafter to states 14, 16, 18, 20, and ultimately, to state 22. State 22 corresponds to the second last pulse position in the next succeeding group of N pulse positions. The next succeeding pulse position has a ONE pulse (corresponding to pulses 32, 36, and 40) forced in it in the process of making transition 23.

Transition 23 carries the system back to state 13 (and not back to state 10) because a ONE must be forced in the next group of N pulse positions in order to meet the pulse density requirements. As illustrated in waveform (a) in FIG. 4, succeeding ZEROs will thereafter cause transitions from state 13 to states 14, 16, 18, 20, and 22, at which point another ONE will be forced corresponding to forced ONE 33 in FIG. 4.

A single ONE at any time in a group of N pulse positions following state 13 will cause a transition to column B and to state 15, 17, 19, or 21. This will avoid the transition 23 forcing the next ONE, but if followed by a long succession of ZEROs, will cause successive transitions up through column B and back to state 13, corresponding to the end of the current group of N pulses. Successive ZEROs thereafter will again cause transitions through states 14, 16, 18, 20 and 22 of column A, forcing a ONE at the end of successive groups of N pulse positions, corresponding to a forced ONE pulse 38 in FIG. 4.

If two ONEs occur at any time after state 14 is entered and before state 21 is reached, as shown by pulses 41 and 42 in FIG. 4, transitions will take place back to state 10, thereby inaugurating an entirely new sequence. This corresponds to ONE pulses 41 and 42 in FIG. 4 where pulse 42 inaugurates a new sequence which may be up to 2N pulse positions long.

The algorithm described by the state diagram of FIG. 1 insures that the long-term pulse density requirement of one pulse for each N pulse position is met and at the same time maximum usage is made of the long sequence of (2N-2) successive ZEROs (the longest possible succession of ZEROs) and thereby minimizing the probability of having to force a ONE at all.

Figure 2:
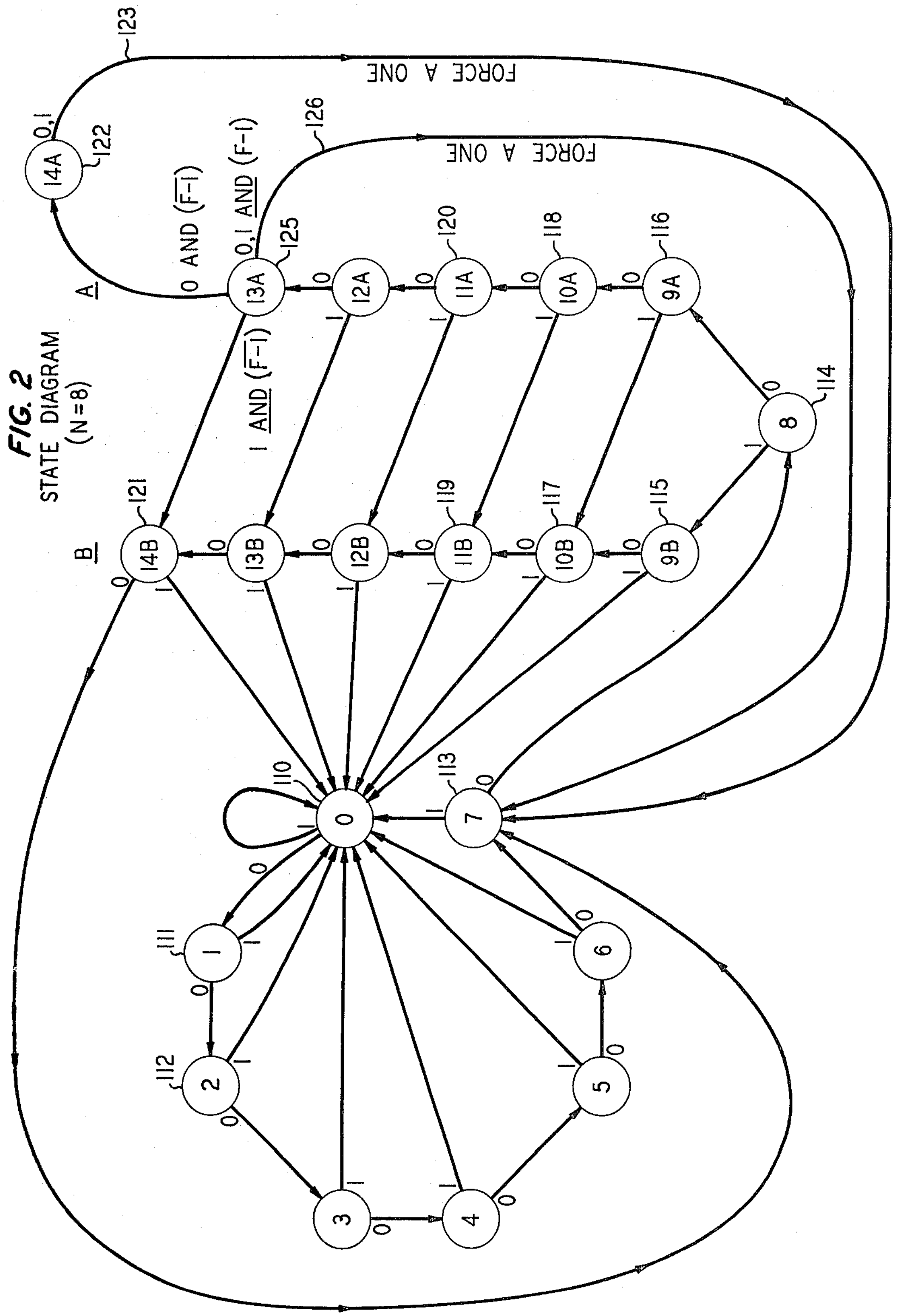
FIG. 2 is a state transition diagram of the zero suppression algorithm of the present invention for an illustrative group length of eight.

In FIG. 2 there is shown a similar state diagram, but in a specific case in which N = 8. States and transitions corresponding to those of FIG. 1 have been given similar reference numerals preceded by the hundreds digit 1. Thus, the beginning state is state 110 and its succeeding states are 111 and 112. State 113 represents the $(N-1)^{th}$ state and is followed by states 114 through 122. One additional state transition (from state 125)

has been added to FIG. 2 to permit an operation that is very valuable in actual pulse transmission systems.

Pulse transmission systems normally require framing of the pulse stream into regularly recurring "words" for proper utilization of the pulse stream. It is common practice to mark such words (or known multiples of such words) by means of framing signals transmitted as a preselected pattern in regularly recurring pulse positions in the sequence. When such a framing technique is used, it is particularly undesirable to force a ONE in the pulse position occupied by the framing bit since proper framing may require this pulse position to assume the ZERO condition. At the same time, it is necessary to maintain the pulse density specified for the transmission system. State 125 is therefore provided just prior to state 122 and represents the pulse position immediately preceding that during which it might become necessary to force a ONE. If this pulse position also corresponds to the last pulse position before the framing pulse position, then transition 126 is taken to force a ONE in this pulse position and thereby avoid forcing a ONE in the next succeeding pulse position.

The state diagram of FIG. 2 corresponds in an obvious way to that of FIG. 1 with the single exception of transition 126 which accommodates framing criteria and which returns the system back to state 113. The state diagram of FIG. 2 can be implemented, as will be shown in connection with FIG. 3, by utilizing the states of a binary counter to represent the states of the state diagram. A flip-flop can be used to distinguish between the states of column A and the states of column B. All of the transitions illustrated are implemented by appropriate logic interconnecting this flip-flop and the binary counter. One such specific embodiment of the algorithm of FIG. 2 will now be described.

Figure 3:
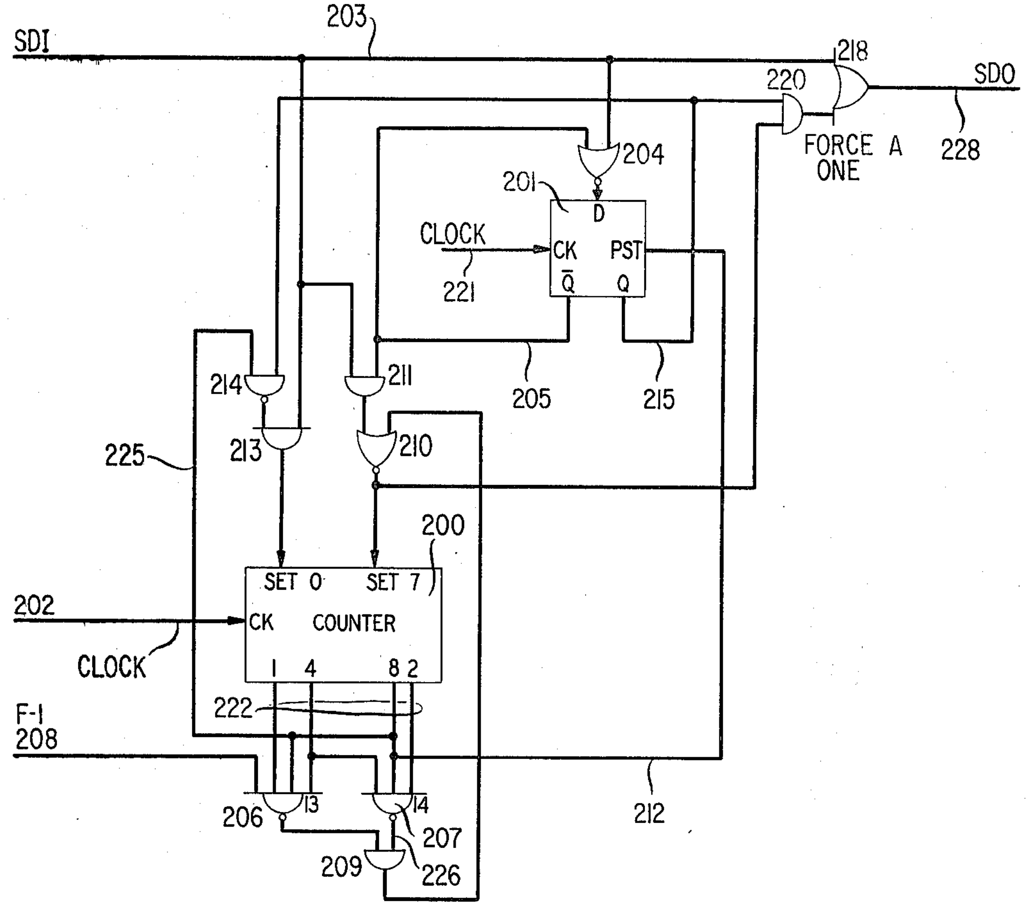
FIG. 3 is a detailed circuit diagram of a zero suppression circuit suitable for implementing the illustrative embodiment of FIG. 2.

The zero suppression circuit of FIG. 3 comprises a four-bit binary counter 200 and a flip-flop 201. The state of counter 200 is represented by the outputs on leads 222, and if inputs SET 7 and SET 0 are both ZERO, the counter advances in normal counting order under control of clock pulse appearing on lead 202. If a ONE appears on either SET 0 or SET 7 of counter 200, the counter state becomes either 0000 or 0111, respectively, at the next clock pulse. The basic function of counter 200 is to record the number of successive ZEROs of input lead 203 by advances in state. Clock pulses appear on lead 202 in synchronism with this data.

The state of flip-flop 201 changes to the valve indicated at its D input under control of clock pulses on lead 221, unless a ZERO appears at the PST input (preset), in which case the flip-flop is immediately and unconditionally set (Q = 1). The Q = 1 state of flip-flop 201 corresponds to the A column of states in FIG. 2, while Q= 0 corresponds to the B column. Within each group, the states are differentiated by the state of counter 200. A preset is always applied to flip-flop 201 if counter 200 is in any of states 0000 through 0111. Clock pulses are applied to the flip-flop at the same times as they are applied to the counter.

Gates 206, 207, 209, 210, 211, 213, and 214 are utilized to detect the conditions under which counter 200 is set to either state 0000 or state 0111, which would also force flip-flop 201 to the A state (Q = 1) via lead 212, when the "SET 0" or "SET 7" operations take place. Counter 200 should be set to 0000 if and only if serial data on input lead 203 is ONE, and the circuit is in one of states 0 through 7 or 9B through 14B of FIG. 2, as determined by the states of counter 200 and flip-flop 201. NAND gate 214 detects the above circuit state. Input lead 225 to gate 214 from counter 200 is ZERO when counter 200 is in one of states 0000 through 0111, while the other input to gate 214 from flip-flop 201 is ZERO if the flip-flop is in the B state (Q = 0). The output of gate 214 is ONE if either input is ZERO. AND gate 213 detects the simultaneous presence of a ONE on the output at gate 214 and on serial data lead 203. The output of gate 213 serves as the "SET 0" input to counter 200.

Referring again to FIG. 2, counter 200 should be set to state 0111 (or 7) if and only if the circuit is in state 14A or in state 14B while data is simultaneously ZERO, or in state 13A while a pulse simultaneously appears on lead 208, indicating the (F-1) time slot in the data stream on lead 203 immediately preceding a framing pulse position. (Of course, the counter may also reach state 0111 by a normal-order counting sequence, but this does not involve the "SET 7" operation.)

Gates 207, 209, 210, and 211 are utilized to detect circuit state 14A as discussed in the preceding paragraph. The inputs of NAND gate 207 are connected to outputs of counter 200 such that the output of gate 207 is ZERO when the counter is in state 14 (1110). The ZERO at the output of gate 207 forces the output of AND gate 209 to ZERO via lead 226; gate 209 in turn forces one input of NOR gate 210 to be ZERO. The output of AND gate 211, which is the second input to NOR gate 210, is forced to ZERO if its input lead 205 from flip-flop 201 is ZERO, indicating state A. Thus the output of gate 210 is ONE if the counter is in state 14 and the flip-flop is in state A.

Detection of state 14B with data on lead 203 simultaneously ZERO is again accomplished by gates 207, 209, 211, and 210, but this time input lead 205 to gate 211 is ONE (state B), so in order for both inputs of gate 210 to be ZERO, the input to AND gate 211 from serial data lead 203 must be ZERO.

Detection of state 13A with a simultaneous pulse on the (F-1) lead 208, is accomplished by gates 206, 209, 210, and 211, with NAND gate 206 serving a function similar to that of gate 207 in the detection of state 14A.

According to FIG. 2, flip-flop 201 should change to state B (Q=0) at the first ONE in the serial data on lead 203 after counter 200 is in state 8 or higher. At counter states lower than 8 (1000) state B is prevented by the action of lead 212 from counter 200. After lead 212 goes to ONE, flip-flop 201 is left at state A (Q=1), such that, due to a ZERO on lead 205 from flip-flop 201 to NOR gate 204, gate 204 simply inverts the serial data on lead 203 and inputs the result to flip-flop 201. Hence, the first ONE appearing on lead 203 will result in a transition of flip-flop 201 to state B (Q=0) at the next clock pulse. Thereafter, until the flip-flop preset lead 212 again goes to ZERO, (as determined by SET 0 and SET 7 operations) flip-flop 201 remains in state B, since a ONE on lead 205 maintains the output of NOR gate 204 at ZERO.

A ONE should be forced in the serial data stream of lead 203 if and only if the circuit is in an A state and the conditions for a SET 7 operation are simultaneously present, as may be seen by examination of FIG. 2. These simultaneous conditions are detected by AND gate 220, which has inputs from the SET 7 lead and lead 215 from flip-flop 201. Due to the action of the output of AND gate 220 upon OR gate 218, which also has as an input the serial data lead 203, the data appearing on lead 228 at the output of gate 218 will be equal to data on lead 203 unless a ONE appears at the gate 220 output, in which case data on lead 228 will be ONE.

It is to be understood that the arrangements of FIG. 3 are illustrative of only one of numerous other ways of implementing the state diagrams in FIGS. 1 and 2. Other forms of logic, other types of counters, and, indeed, other ways of storing the various states of the state diagrams of FIGS. 1 and 2 would be equally suitable.

What is claimed is:

1. A zero suppression circuit comprising:
- a counter,
- a flip-flop circuit,
- a source of a data pulse stream,
- means responsive to said data pulse stream for initially resetting said counter and said flip-flop each time a second pulse appears within N successive pulse positions in said data stream,
- means for resetting said counter each time a pulse appears in any one of the first N pulse positions of said data stream after said initial resetting,
- means for setting said flip-flop after the first pulse appearing in said stream in the next (N-2) pulse positions following a count of N in said counter,
- means for setting said counter to a count of (N-1) and resetting said flip-flop after (N-1) pulse positions following said count of N and including no more than one pulse; and
- means for forcing a pulse into the (N-1)st pulse position following said count of N in said counter if no pulse occurs in the next (N-2) pulse positions preceding unit (N-1)st pulse position.

2. A zero suppression circuit for serial pulse data comprising:
- a pulse position counter,
- means for forcing a pulse into said serial pulse data to provide at least one pulse in each group of N or less pulse positions for at least one possible division of said pulse stream into such groups, and
- means for delaying said pulse forcing means to the end of a group of 2N pulse positions whenever consistent with the above-stated forcing criteria.

3. The zero suppression circuit according to claim 2 wherein said counter comprises a binary counter and said delaying means comprises a bistable circuit.

4. The zero suppression circuit according to claim 3 wherein N is eight.

5. The method according to claim 2 further including means for avoiding pulse forcing in a framing pulse position by forcing a pulse in the preceding pulse position whenever forcing would otherwise be necessary in said framing pulse position.

6. The method of forcing a minimum number of pulses into a binary pulse train to maintain a preselected global pulse density ratio of 1/N and a local pulse density of at least one pulse in each group of N or less pulse positions, said method comprising the steps of:
1. counting successive pulse positions in which no pulses occur;
2. when said no-pulse count exceeds (N-1), counting the number of pulses appearing in the next group of N successive pulse positions;
3. when said pulse count is zero, forcing a pulse in the last pulse position of said next group of N successive pulse positions and returning to step (2);
4. when said pulse count is one, omitting to force a pulse in said next group of N successive pulse positions, and returning to step (2); and
5. when said pulse count is two, returning to step (1) on the next succeeding pulse position in which no pulse occurs.

7. The method of suppressing ZEROs in a stream of pulse positions comprising the steps of:
1. counting pulse positions,
2. forcing a pulse into said stream of pulse positions to provide at least one pulse in each group of N or less pulse positions for at least one possible division of said pulse stream into such groups, and
3. delaying said pulse forcing to the end of a group of 2N pulse positions whenever consistent with the above-stated forcing criteria.

8. The method of suppressing ZEROs according to claim 7 wherein N is eight.

9. The method of suppressing ZEROs according to claim 7 further including the step of:

4. avoiding pulse forcing in a framing pulse position by forcing a pulse in the preceding pulse position whenever forcing would otherwise be necessary in said framing pulse position.

* * * * *